United States Patent [19]

Steudler, Jr.

[11] Patent Number: 5,222,462
[45] Date of Patent: Jun. 29, 1993

[54] WATERING SYSTEM FOR FOWL/SMALL ANIMALS

[75] Inventor: Frederick W. Steudler, Jr., Providence, Pa.

[73] Assignee: Val Products, Inc., Bird-in-Hand, Pa.

[21] Appl. No.: 866,639

[22] Filed: Apr. 10, 1992

[51] Int. Cl.⁵ .............................................. A01K 7/00
[52] U.S. Cl. ...................................... 119/72.5; 119/75
[58] Field of Search .................. 119/72, 72.5, 75, 18, 119/51.01; 239/547, 542

[56] References Cited

U.S. PATENT DOCUMENTS

| | | | |
|---|---|---|---|
| 3,062,621 | 1/1975 | Peppler et al. | 119/75 |
| 3,353,518 | 11/1967 | Hart | 119/75 |
| 3,405,686 | 10/1968 | Hart | 119/75 |
| 3,537,430 | 11/1970 | Peppler | 119/72.5 |
| 4,055,147 | 10/1977 | Fletcher et al. | 119/72.5 |
| 4,248,178 | 3/1981 | Kneubuehl | 119/75 |
| 4,257,354 | 3/1981 | Gillette et al. | 119/72.5 |
| 4,543,912 | 10/1985 | Steudler et al. | 119/72 X |
| 4,649,866 | 3/1987 | Shomer | 119/75 |
| 4,790,264 | 12/1988 | Lack et al. | 119/72.5 |
| 5,003,922 | 4/1991 | Niki et al. | 119/72.5 X |

*Primary Examiner*—Gene Mancene
*Assistant Examiner*—Thomas Price
*Attorney, Agent, or Firm*—Diller, Ramik & Wight

[57] ABSTRACT

A drinker for feeding liquid to fowl and/or small animals includes a housing having an outlet through which liquid/water flows under the control of a valve operated by a drinker 10 which is actuated by the fowl and-/or small animals. The water outlet and particularly the pin is supported above an uppermost top wall of a wire cage which prevents inadvertent/accidental operation of the pin to prevent water leakage. An inlet is directed into an associated water pipe from above with an associated outlet thereof being spaced above a lowermost portion of the water pipe to preclude accumulated sediment from entering the drinker and causing the valve to remain in its open position.

47 Claims, 2 Drawing Sheets

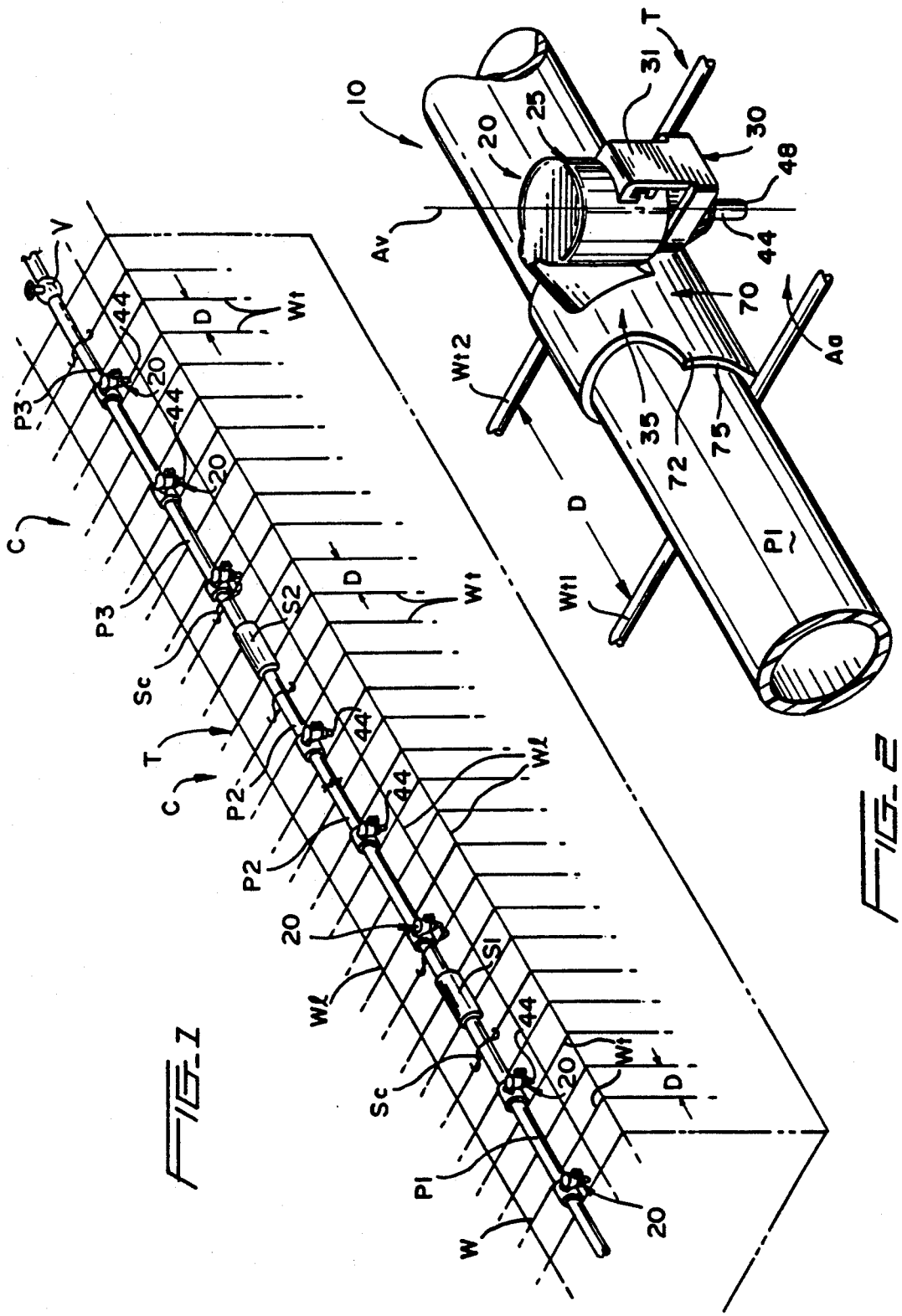

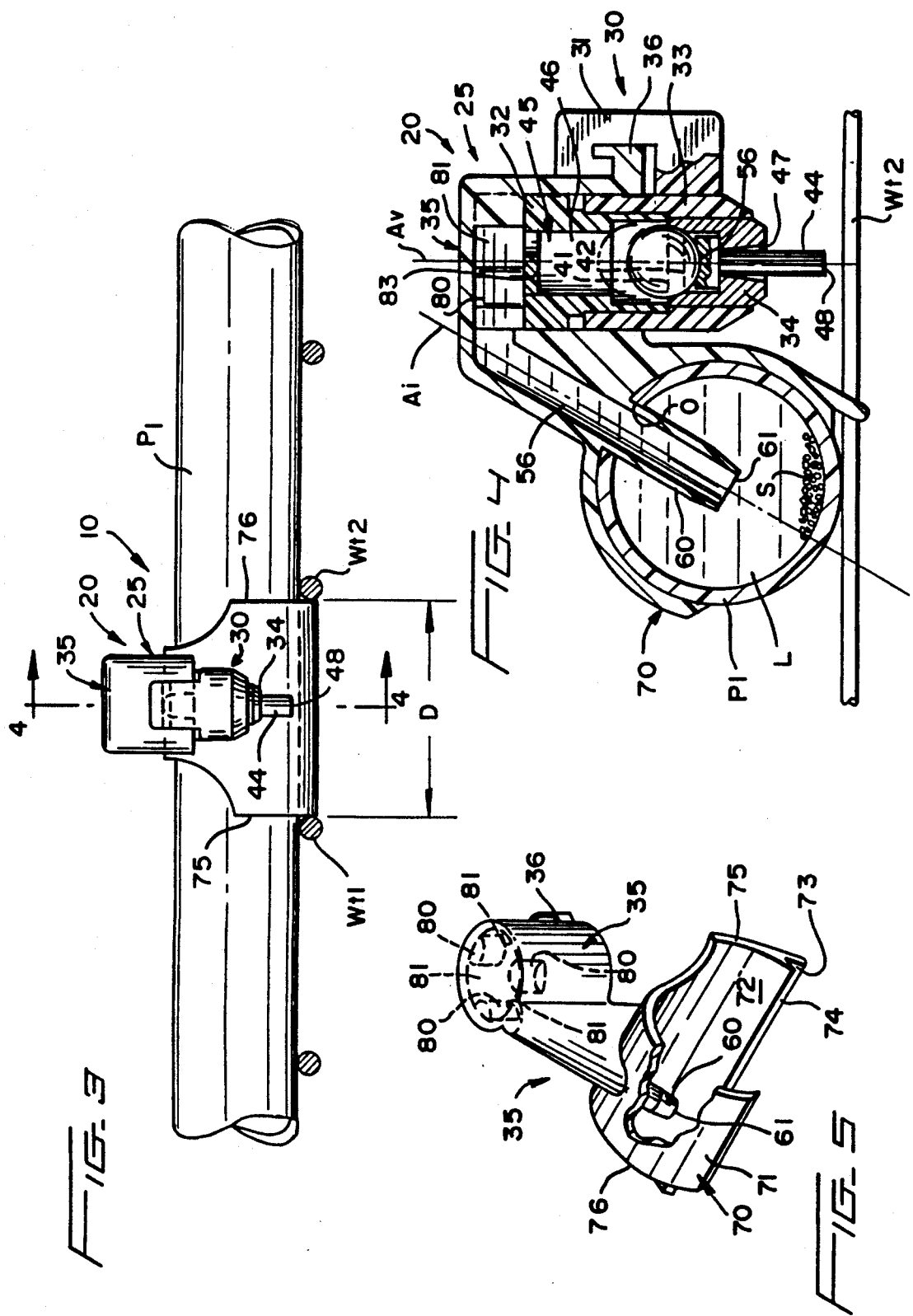

WATERING SYSTEM FOR FOWL/SMALL ANIMALS

BACKGROUND OF THE INVENTION

This invention relates to a watering system for fowl, poultry or similar animals.

Typical conventional watering systems include height-adjustable watering systems in which a watering pipe connected to a source of water carries a plurality of drinkers/nipples and is suspended in an appropriate adjustable manner to permit elevation changes as the animals increase in size. Typical of the latter is the height-adjustable watering system disclosed in U.S. Pat. No. 4,884,512 issued on Dec. 5, 1989 to Frederick W. Steudler, Jr. and entitled Water Pipe Bracket and Clip for Poultry, Small Animals and the Like Watering System. The water pipes rest atop the top wires of wire cages and the nipples and nozzles, and particularly the drinking pins thereof, project downwardly into the cages and are thereat accessed by the poultry/small animals. The latter watering system is exemplified by Pat. No. 4,543,912 issued Oct. 1, 1985 in the name of Fredrick W. Steudler, Jr. and entitled Watering System for Fowl.

The drinking nipples/nozzles associated with either of the latter described systems and others are preferably constructed in accordance with the disclosures of Pat. Nos. 4,606,301; 4,610,221; and 4,660,509 issued respectively Aug. 19, 1986; Sep. 9, 1986 and Apr. 28, 1989, all in the name of Frederick W. Steudler, Jr.

SUMMARY OF THE INVENTION

While the latter systems and the associated drinking nipples have proved imminently successful from both the standpoint of operability and commercial success, a number of improvements have been effected therein in accordance with the present invention, particularly to lessen water spillage and the attendant disadvantages thereof, namely, foul odors created when water wets the bird/small animal excrement collected beneath the cages, and the added difficulty in effecting clean-up thereof, as compared to dry excrement. The spillage is reduced by constructing a housing of the nipple or drinker such that an inlet stem or passage draws water from the liquid line or liquid pipe at a point well above the bottom of the internal surface of the liquid line where most dirt, sediment, debris or the like tends to collect. Accordingly, clean sediment-free water passes through the drinker(s), its passage and associated ball valve, valve seat(s) and associated actuator pin. The absence or lessening of sediment obviously keeps the latter items cleaner longer and assures that the ball valve will at all times seat upon the valve seat(s) preventing spillage, as might otherwise occur if even a little speck of sediment were entrapped therebetween.

The spillage is also reduced by positioning the nipple housing and particularly the liquid outlet and the associated actuator pin above the uppermost wires defining the top wall of the cage. Since the individual actuator pins of the nipples or drinkers do not project into the cage through the access areas defined by the crossed top wires thereof, the bird/animals within the cage cannot inadvertently bump the actuator pins thereby inadvertently unseating the valves which would result in water dispensing absent animal drinking. In conventional wire cages, the actuator pins project into the cages and thus are susceptible to being inadvertently actuated by animal movement, such as the simple acts of birds "flapping" their wings, preening or other movement which would bring the feathers of the birds into contact with the actuator pins and thereby create pin actuation and attendant spillage.

The latter construction of the drinkers/nipples not only prevents spillage, but since the nipples/drinkers or the housings thereof do not project into the cages, less volume is wasted and, therefore, more volume is available for the animals. Cages have become smaller as has the number of birds/small animals per cage, and the latter can be advantageously overcome by the present invention through the resourceful location of the nipples/drinkers exteriorly of the associated cages to provide increased cage volume.

In further accordance with the present invention, the housing of the nipples/drinkers is also provided with an extended saddle or skirt which is of a length to fit snugly between adjacent pairs of wires of an associated wire cage. Thus, each housing serves as a location point for the liquid line or liquid pipe and prevents shifting in opposite directions parallel to its length. Such water lines are normally plastic pipes of approximately 10' lengths which are joined by O-ring connectors, as disclosed in Pat. No. 4,543,912. Obviously, in the case of friction-fit type connections between two pipes and their adjacent connecting connector, it would be disastrous if either of the pipes or both pipes shifted sufficiently to disconnect from their coupling or associated seals. Accordingly, by locating the nipple/drinker housings in specific relationship to the wires of the cage, axial relative shifting of the water pipes is essentially reduced or eliminated to prevent relative uncoupling-/leakage thereof.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel watering system of the present invention, and illustrates a plurality of nipples/drinkers carried by each of a plurality of pipes joined by couplers and resting atop wires of a wire cage.

FIG. 2 is an enlarged fragmentary elevational view, partially in cross-section, of one of the pipes and nipples/drinkers of FIG. 1, and illustrates the manner in which a housing locates the nipple/drinker between two spaced wires to prevent shifting of the pipe in either direction parallel to its length.

FIG. 3 is a fragmentary side elevational view of the pipe and nipple/drinker of FIG. 2, and more clearly illustrates the manner in which an extension of a saddle of a housing projects between adjacent wires of the cage and also the location of an actuator pin of the nipple outwardly and above the top cage wires.

FIG. 4 is an enlarged cross-sectional view taken generally along line 4—4 of FIG. 3, and more clearly illustrates the details of the nipple/drinker and particularly a stem which projects into the liquid line/water pipe at a point well above a lowermost portion thereof.

FIG. 5 is a perspective view of a portion of the housing with a part thereof broken away for clarity, and illustrates the details of a support or saddle for securing the housing to the water pipe.

DESCRIPTION OF THE PREFERRED EMBODIMENT

A novel poultry/small animal or the like watering system constructed in accordance with this invention is fully illustrated in FIG. 1 of the drawings, and is generally designated by the reference numeral 10. The watering system 10 is associated with a plurality of side-by-side wire cages which are singularly and collectively designated by the reference character C. Each cage C is formed by a plurality of wires W which set-off opposite parallel end walls (unnumbered), opposite parallel side walls (unnumbered) which are normal to the end walls, a bottom wall (not shown) and a top wall T. The top wall T is defined or set-off by a plurality of longitudinally extending generally parallel wires W1 and intersecting transverse wires Wt with adjacent pairs Of the latter being spaced a predetermined distance D from each other, as is specifically illustrated in FIGS. 2 and 3 with the distance between two spaced transverse wires Wt1 and Wt2 being designated by the reference character D. The distance D is, of course, the same between all adjacent transverse wires Wt.

Resting atop the top T of the cage(s) C are a plurality of water/liquid pipes, lines or conduits P1, P2 and P3 which are connected to each other by sleeve-like coupling S1, S2. The couplings S1, S2 correspond identically to the couplings 10 fully disclosed in Pat. No. 4,543,912 and the totality of the description thereof is herein incorporated by reference. A plurality of suitable clips, such as spring clips Sc having looped ends (unnumbered) are utilized to hold the pipes P1-P3 atop the wire top T of the cage C, again in the manner further illustrated and described in Pat. No. 4,543,912.

A valve V can be opened/closed/adjusted to deliver an appropriate flow of water through the pipes P1-P3 to a series of identical nipples/drinkers 20 of which one specific drinker 20 is best illustrated in FIGS. 2 through 4 of the drawings to which reference is now made.

The nipple or drinker 20 of FIGS. 2 through 4 includes a housing 25 formed of injection-molded polymeric/copolymeric plastic material, such as polyethylene or the like. The housing 25 is formed of two separate but interconnected housing portions or bodies, namely, a first housing portion or body 30 and a second housing portion or body 35 having respective hooks 31, 36 (FIG. 4). The first housing portion or body 30 is constructed identically to the corresponding housing portion or body illustrated and described in Pat. No. 4,610,221 which description and operation is herein incorporated by reference. Essentially, the first housing portion or body 30 includes a lid 32 tightly telescopically fit within a sleeve 33 which in turn receives a metal tubular insert 34 defining valve seats 41, 42 which are normally closed by a valve or ball valve 43 which is in turn actuated to an open position by a pin 44 to open passage means 45. The passage means or passage 45 is defined by a pair of passage portions, one being a passage portion 46 disposed concentric to a vertical axis Av and another passage portion 56 having an axis coincident to an inclined axis Ai, as will be described more fully hereinafter. Upon unseating of the ball 43 due to movement imparted to the pin 44 by a bird or a small animal, the ball valve or ball 43 will rise to unseat from the valve seats 41, 42 and water will flow along the exterior of the pin 44 into the beak/mouth of an associated animal. It is to be particularly noted that a liquid outlet 47 defined by the insert 34 is located well above the wires Wt and/or W1 of the cage top T, as is a terminal end 48 of the actuator pin 44. Accordingly, in order to actuate the pin 44, a bird, for example, must project its beak upwardly through an access area Aa (FIG. 2) defined between adjacent wires Wt1, Wt2 which creates a higher or more acute (relative to the vertical) attack angle which in turn more readily assures that water will flow from the exterior of the pin into the animals mouth absent spillage. Furthermore, since the pin 44 and the terminal end 48 thereof are located above a horizontal plane taken through the wires Wt1, Wt2 of the wire top wall T, the pin 44 is not susceptible to inadvertent/accidental movement, as would otherwise be the case if the same projected through the access area Aa and into the cage C below the horizontal plane latter defined. In the latter case the pin(s) 44 could be continually inadvertently/accidentally touched and brushed sufficiently to be actuated by such simple activities as a bird flapping its wings, preening, etc. Accordingly, by locating the entirety of the nipple/drinker above the top T, but particularly the liquid outlet means 47 and the pin 44 associated therewith, inadvertent/accidental actuation of the pin 44 with attendant undesired opening of the ball valve 43 and the dispensing of water is precluded.

Each of the nipples or drinkers 20 is also constructed and arranged to prevent or minimize sediment s within any one of the pipes P1-P3 from entering the passage means 45 through the passage portion 56 thereof which might, for example, lodge between the ball 43 and the seats 41, 42 and/or the insert 34 to hold the ball 43 in its open position and cause continuous dispensing/leakage of water pass the ball 43. The sediment S within the liquid L in any one of the pipes P1-P3 normally settles at or adjacent a lowermost portion (unnumbered) of the pipes P1-P3 and to preclude the introduction of the sediment into the passage portion 56, the latter is in part defined by a projecting stem 60 terminating in liquid inlet means or an opening 61 disposed well above the lower portion of the pipe P1 and well above the sediment S resting thereupon. The stem 60 projects through a circular opening O formed in the pipe P1, and all remaining water pipes with which the nipples or drinkers 20 are associated, and an appropriate adhesive forms a water-tight seal between the surface of the pipe P1 defining the opening O and the exterior surface (unnumbered) of the stem 60. Thus, because of the location of the liquid inlet means or opening 61 of the stem 60 well above the lowermost portion of the pipe P1, the sediment S will not enter the pipe portion 56. Furthermore, the inclined axis Ai of the pipe portion 56 is disposed at an acute angle to the vertical (approximately 30°), thus any sediment S which tends to rise in the passage portion 56 during upward water flow will tend to drop back under the influence of gravity when the water flow ceases. Accordingly, the location of the inlet 61 well above the lowermost portion of the pipes P1-P3 virtually assures that sediment S will not enter the passage portion 56 upon the unseating of the valve 43, but should the latter occur, when the ball 43 reseats, any such sediment s which may have entered the inclined passage portion 56 will, under the influence of gravity, tend to drop downwardly and outwardly therefrom falling, once again, toward the lowermost portion of any one of the pipes P1-P3.

Each of the nipples or drinkers 20 also includes support means 70 in the form of a generally semi-cylindrical saddle having a short arcuate portion 71 and a relatively longer arcuate portion 72 with the latter having a groove 73 formed along the length thereof which in turn defines a projecting tongue 74. The internal surface (unnumbered) of the saddle 70, including both arcuate portions 71, 72, is also adhesively bonded to the exterior of the associated pipes P1-P3. Thus, the saddle 70 rigidly secures the housing 25 in the position best illustrated in FIGS. 2, 3 and 4 with the axis Av generally precisely vertical to assure appropriate operation of the pin 44. The tongue 74, and particularly opposite generally parallel edges 75, 76 (FIG. 3) thereof, define means for generally limiting shifting movement of the housing 25 and, thus, the nipple or drinker 20, in either of two opposite directions generally parallel to the axis of the water line or pipes P1-P3. As is best illustrated in FIG. 3, the wires Wt1-Wt2 and all adjacent wires Wt are located a predetermined distance D from each other. The edges 75, 76 of each of the saddles 70 are spaced approximately the same distance D from each other and fit snugly between all adjacent wires Wt and generally abut the same, as is best shown in FIG. 3 relative to the wires Wt1 and Wt2. Accordingly, any tendency of the pipes P1 to shift in either direction relative to their longitudinal axes is prevented and, thus, uncoupling of the pipes P1-P3 relative to the sleeve couplings S1, S2, etc. is precluded.

Means generally designated by the reference numeral 80 define equally spaced semi-cylindrical abutments against which the lid 32 bottoms (FIG. 4) upon the insertion of the housing portion 30 into the housing portion 35. The abutments 80 accurately locate the lid 32 and the housing portions 30, 35 relative to each other and assures rotational engagement and disengagement of the hooks 31, 36. Furthermore, each adjacent pair of abutments 80 define a passage 81 therebetween through which the liquid can pass from the passage portion 56 through one of the aligned passages 81 and thereafter downwardly through an apertured cap or top wall 83 of the lid 32 into the second passage portion 45 for dispensing in the manner heretofore described.

Other advantages of the invention will be apparent beyond those heretofore mentioned. For example, since the nipples or drinkers 20 are supported entirely exterior of the cage C, one need not open a door (not shown) of the cage to withdraw drinkers or nipples therefrom for cleaning or replacement purposes, as is common in conventional systems in which the drinkers are located within the cages and/or must be removed through the doors thereof. It is also to be recognized that the pipes P1, P2, P3 are shown to be disposed in a perfectly horizontal plane when in actual practice the main water pipes P1, etc. undulate vertically simply because they rest upon the tops T of the cages and the cages are simply not perfectly horizontal. Such undulations tend to entrap air in the pipe P1, etc. which in turn prevents equalization of pressure throughout the length of the pipe and accordingly prevents equalized flow through each of the drinkers. However, in accordance with the present invention, the air tends to be bled out of the system because the opening 61 is above the bottom of the pipe P1, etc. and, thus, air is not trapped or at least not as much air is trapped as in other systems which equalizes pressure and equalizes flow to the various drinkers. Another advantage of directing the stem 60 into the pipes P1, etc. from above, rather than directly from the bottom, as is conventional, is that there are no obstructions in the bottom of the pipes P1, etc. and, thus, the latter can be flushed easily. Hence the debris S can be flushed/removed in the absence of blockades or barricades thereto, as is created with conventional drinkers opening into the bottom of the conventional pipes.

Of course, of major importance is the fact that since all of the drinkers 20 are located entirely outside of the cages C with the pins 44 well above the tops T, a higher approach angle or angle attack thereto by the animals/poultry allows the water to be fed directly into the mouths/beaks thereof. Thus, less water is wasted, less water falls into the pits below the cages C, and the dryer the pits, the less the odor, the easier the same can be cleaned, etc.

Although a preferred embodiment of the invention has been specifically illustrated and described herein, it is to be understood that minor variations may be made in the apparatus without departing from the spirit and scope of the invention, as defined the appended claims.

I claim:

1. A nipple particularly adapted for feeding liquid to fowl and/or small animals comprising a housing, means defining an inlet for introducing liquid into said housing, means defining an outlet having a generally vertically disposed axis for delivering liquid out of said housing, passage means in said housing for placing said liquid inlet means and said liquid outlet means in fluid communication with each other, said passage means having a generally vertically disposed axis, valve means for controlling the flow liquid through said passage means, pin means for actuating said valve means, said pin means having a generally vertically disposed axis, and means constructed and arranged for supporting said housing relative to a liquid line such that liquid from the liquid line enters said liquid inlet means in other than a downward direction and an axis of the liquid line being disposed generally normal to said liquid outlet means, passage means and pin means axes.

2. The nipple as defined in claim 1 wherein said housing supporting means effects liquid entry from the liquid line in a generally upward direction into said liquid inlet means.

3. The nipple as defined in claim 1 wherein said housing supporting means effects liquid entry from above a lowermost portion of the liquid line thereby reducing the introduction of sediment, debris and the like into said liquid inlet means.

4. The nipple as defined in claim 1 wherein said housing supporting means effects liquid entry from the liquid line in a generally upward direction inclined to the vertical into said liquid inlet means.

5. The nipple as defined in claim 1 including means defined by said housing for locating said liquid outlet means generally above a fowl and/or small animal cage upon an upper surface of which the liquid line is adapted to be supported.

6. The nipple as defined in claim 1 including means defined by said housing for locating said pin means generally above a fowl and/or small animal cage upon an upper surface of which the liquid line is adapted to be supported.

7. The nipple as defined in claim 1 wherein said passage means includes first and second passage portions, said first passage portion includes said liquid inlet means, said second passage portion includes said liquid outlet means and said first and second passage portions are other than in concentric relationship to each other.

8. The nipple as defined in claim 1 wherein said passage means includes first and second passage portions, said first passage portion includes said liquid inlet means, said second passage portion includes said liquid outlet means, and said first and second passage portions each include an axis which set-off an acute angle therebetween.

9. The nipple as defined in claim 1 including means defined by said housing for generally limiting shifting of said housing in opposite directions generally parallel to an axis of an associated liquid line.

10. The nipple as defined in claim 1 wherein said supporting means includes means for generally limiting shifting movement of said housing in opposite directions generally parallel to an axis of an associated liquid line.

11. The nipple as defined in claim 1 wherein said supporting means includes saddle means for generally exteriorly embracing an associated liquid line, and saddle means includes means for generally limiting shifting movement of said housing in opposite directions generally parallel to an axis of an associated liquid line.

12. The nipple as defined in claim 1 wherein said supporting means includes saddle means for generally exteriorly embracing an associated liquid line, saddle means includes means for generally limiting shifting movement of said housing in opposite directions generally parallel to an axis of an associated liquid line, and said housing movement limiting means are abutment surfaces spaced from each other a distance corresponding to the distance between a pair of wires of a top wall of a cage for fowl and/or small animals.

13. The nipples as defined in claim 1 wherein said supporting means includes saddle means for generally exteriorly embracing an exterior of an associated liquid line, said passage means includes first and second passage portions, said first passage portion being at least in part defined by a stem projecting into an area set-off by said saddle means, said valve means being located in said second passage portion, and said first and second passage portions each include an axis which set-off an acute angle therebetween.

14. The nipple as defined in claim 13 wherein said housing supporting means effects liquid entry from the liquid line in a generally upward direction into said liquid inlet means.

15. The nipple as defined in claim 13 wherein said housing supporting means effects liquid entry from above a lowermost portion of the liquid line thereby reducing the introduction of sediment, debris and the like into said liquid inlet means.

16. The nipple as defined in claim 13 wherein said housing supporting means effects liquid entry from the liquid line in a generally upward direction inclined to the vertical into said liquid inlet means.

17. The nipple as defined in claim 13 including means defined by said housing for locating said liquid outlet means generally above a fowl and/or small animal cage upon an upper surface of which the liquid line is adapted to be supported.

18. The nipple as defined in claim 13 including means defined by said housing for locating said pin means generally above a fowl and/or small animal cage upon an upper surface of which the liquid line is adapted to be supported.

19. The nipple as defined in claim 1 including means defined by said housing for locating said pin means generally above a fowl and/or small animal cage upon an upper surface of which the liquid line is adapted to be supported.

20. The nipple as defined in claim 1 including means defined by said housing for locating said liquid outlet means and said pin means generally above a fowl and/or small animal cage upon an upper surface of which the liquid line is adapted to be supported.

21. The nipple as defined in claim 1 including means defined by said housing for locating said liquid outlet means, said pin means and said passage means generally above a fowl and/or small animal cage upon an upper surface of which the liquid line is adapted to be supported.

22. The nipple as defined in claim 1 including means defined by said housing for generally limiting shifting of said housing in opposite directions generally parallel to an axis of an associated liquid line by opposite surface means of said housing located between spaced wires of an associated fowl and/or small animal cage.

23. The nipple as defined in claim 1 wherein said supporting means including means for generally limiting shifting movement of said housing in opposite directions generally parallel to an axis of an associated liquid line by opposite surface means of said housing located between spaced wires of an associated fowl and/or small animal cage.

24. The nipple as defined in claim 1 wherein said supporting means includes saddle means for generally exteriorly embracing an associated liquid line, and saddle means includes means for generally limiting shifting movement of said housing in opposite directions generally parallel to an axis of an associated liquid line by opposite surface means of said housing located between spaced wires of an associated fowl and/or small animal cage.

25. A nipple particularly adapted for feeding liquid to fowl and/or small animals comprising a housing, means defining an inlet for introducing liquid into said housing, means defining an outlet for delivering liquid out of said housing, passage means in said housing for placing said liquid inlet means and said liquid outlet means in fluid communication with each other, valve means for controlling the flow liquid through said passage means, and means constructed and arranged for supporting said housing relative to a liquid line supported by a wire cage such that said liquid outlet means is located generally above wire defining an upper wire wall of a wire cage with an axis of said liquid outlet means being disposed generally vertically.

26. The nipple as defined in claim 25 including pin means projecting from said liquid outlet means for operating said valve means in response to actuation thereof by a fowl and/or small animal, and said supporting means further supports said pin means generally above wire defining an upper wire wall of a wire cage.

27. A watering system comprising a cage including a top wall defined by crossing wires setting-off access areas therebetween, a liquid line disposed above said top wall, a nipple adapted for feeding liquid from the liquid line to fowl and/or small animals in the cage through at least one of said access areas, said nipple including a housing means defining an inlet for introducing liquid from said liquid line into said housing, means defining an outlet for delivering liquid out of said housing, passage means in said housing for placing said liquid inlet means and said liquid outlet means in fluid communication with each other, valve means for controlling the flow liquid through said passage means, and means constructed and arranged for supporting said housing relative to a liquid line such that liquid from the liquid line enters said liquid inlet means in other than a downward direction and said liquid outlet means is supported generally above said cage top wall.

28. The watering system as defined in claim 27 wherein said housing supporting means effects liquid entry from the liquid line in a generally upward direction into said liquid inlet means.

29. The watering system as defined in claim 27 wherein said housing supporting means effects liquid entry from above a lower-most portion of the liquid line thereby reducing the introduction of sediment, debris and the like into said liquid inlet means.

30. The watering system as defined in claim 27 wherein said housing supporting means effects liquid entry from the liquid line in a generally upward direction inclined to the vertical into said liquid inlet means.

31. The watering system as defined in claim 27 including means defined by said housing for locating said liquid outlet means generally above said cage top wall whereby liquid can be obtained by a fowl/small animal accessing said liquid outlet means through said access area.

32. The watering system as defined in claim 27 including pin means projecting from said liquid outlet means for operating said valve means in response to actuation thereof by a fowl and/or small animal, and means defined by said housing for locating said pin means generally above said cage top wall whereby liquid can be obtained by a fowl/small animal accessing said liquid outlet means through said access area.

33. The watering system as defined in claim 27 wherein said passage means includes first and second passage portions, said first passage portion includes said liquid inlet means, said second passage portion includes said liquid outlet means and said first and second passage portions are other than in concentric relationship to each other.

34. The watering system as defined in claim 27 wherein said passage means includes first and second passage portions, said first passage portion includes said liquid inlet means, said second passage portion includes said liquid outlet means, and said first and second passage portions each include an axis which set-off an acute angle therebetween.

35. The watering system as defined in claim 27 wherein said passage means includes first and second passage portions, said first passage portion includes said liquid inlet means, said second passage portion includes said liquid outlet means, and said first and second passage portions each include an axis which set-off an acute angle therebetween, and the axis of said second passage portion is disposed generally vertical.

36. The watering system as defined in claim 27 including means defined by said housing for generally limiting shifting of said housing in opposite directions generally parallel to an axis of said liquid line.

37. The watering system as defined in claim 27 wherein said supporting means includes means for generally limiting shifting movement of said housing in opposite directions generally parallel to an axis of said liquid line.

38. The watering system as defined in claim 27 wherein said supporting means includes saddle means for generally exteriorly embracing said liquid line, and saddle means includes means for generally limiting shifting movement of said housing in opposite directions generally parallel to an axis of an associated liquid line.

39. The watering system as defined in claim 38 wherein said supporting means includes saddle means for generally exteriorly embracing an associated liquid line, saddle means includes means for generally limiting shifting movement of said housing in opposite directions generally parallel to an axis of an associated liquid line, and said housing movement limiting means are abutment surfaces spaced from each other a distance corresponding to the distance between a pair of adjacent wires of said top wall.

40. The watering system as defined in claim 27 wherein said supporting means includes saddle means for generally exteriorly embracing an exterior of said liquid line, said passage means includes first and second passage portions, said first passage portion being at least in part defined by a stem projecting into an area set-off by said saddle means and into said liquid line, said valve means being located in said second passage portion, and said first and second passage portions each include an axis which setoff an acute angle therebetween.

41. The nipple as defined in claim 40 wherein said housing supporting means effects liquid entry from the liquid line in a generally upward direction into said liquid inlet means.

42. The nipple as defined in claim 40 wherein said housing supporting means effects liquid entry from above a lowermost portion of the liquid line thereby reducing the introduction of sediment, debris and the like into said liquid inlet means.

43. The nipple as defined in claim 40 wherein said housing supporting means effects liquid entry from the liquid line in a generally upward direction inclined to the vertical into said liquid inlet means.

44. The nipple as defined in claim 40 including means defined by said housing for locating said liquid outlet means generally above a fowl and/or small animal cage upon an upper surface of which the liquid line is adapted to be supported.

45. The nipple as defined in claim 40 including pin means projecting from said liquid outlet means for operating said valve means in response to actuation thereof by a fowl and/or small animal, and means defined by said housing for locating said pin means generally above a fowl and/or small animal cage upon an upper surface of which the liquid line is adapted to be supported.

46. A watering system comprising a cage including a top wall defined by crossing wires setting-off access areas therebetween, a liquid line disposed above said top wall, a nipple adapted for feeding liquid from the liquid line to fowl and/or small animals in the cage through at least one of said access areas, said nipple including a housing means defining an inlet for introducing liquid from said liquid line into said housing, means defining an outlet for delivering liquid out of said housing, passage means in said housing for placing said liquid inlet means and said liquid outlet means in fluid communication with each other, valve means for controlling the flow liquid through said passage means, and means constructed and arranged for supporting said housing relative to said liquid line such that liquid outlet means is located above said crossing wires and said at least one access area whereby fowl and/or small animals access said liquid outlet means through said at least one access area.

47. The watering system as defined in claim 46 including pin means projecting from said liquid outlet means for operating said valve means in response to actuation thereof by a fowl and/or small animal, and said supporting means further supports said pin means generally above said crossing wires and said at least one access area whereby fowl and/or small animals access said liquid outlet means through said at least one access area.

* * * * *